(12) United States Patent
Yuan et al.

(10) Patent No.: US 10,087,291 B2
(45) Date of Patent: Oct. 2, 2018

(54) PROCESS TO INCORPORATE WET NATURAL FIBER AND STARCH INTO THERMOPLASTICS

(71) Applicant: FPInnovations, Pointe-Claire (CA)

(72) Inventors: Zhirun Yuan, Pointe-Claire (CA); Michael Paleologou, Beaconsfield (CA); Qingkai Meng, Montreal (CA); Changbin Mao, Pierrefonds (CA); Yunli Fang, Edina, MN (US)

(73) Assignee: FPInnovations, Pointe-Claire, QC (CA)

( * ) Notice: Subject to any disclaimer, the term of this patent is extended or adjusted under 35 U.S.C. 154(b) by 14 days.

(21) Appl. No.: 15/301,958

(22) PCT Filed: Mar. 18, 2015

(86) PCT No.: PCT/CA2015/050200
§ 371 (c)(1),
(2) Date: Oct. 5, 2016

(87) PCT Pub. No.: WO2015/154175
PCT Pub. Date: Oct. 15, 2015

(65) Prior Publication Data
US 2017/0204229 A1    Jul. 20, 2017

Related U.S. Application Data

(60) Provisional application No. 61/977,972, filed on Apr. 10, 2014.

(51) Int. Cl.
*C08L 23/06*    (2006.01)
*C08J 3/18*    (2006.01)
(Continued)

(52) U.S. Cl.
CPC ............. *C08J 3/18* (2013.01); *B29C 70/06* (2013.01); *B29C 70/28* (2013.01); *C08J 3/203* (2013.01);
(Continued)

(58) Field of Classification Search
CPC .... C08K 5/0016; C08K 3/061; C08K 5/1545; C08L 3/00; C08L 23/10
See application file for complete search history.

(56) References Cited

U.S. PATENT DOCUMENTS 6,231,970 B1    5/2001    Andersen
8,187,423 B1    5/2012    Glenn et al.
(Continued)

FOREIGN PATENT DOCUMENTS

CA    2465069    5/2003
CN    102161796    8/2011
(Continued)

OTHER PUBLICATIONS

CN 102229750 A ( Nov. 2, 2011); machine translation.*
(Continued)

*Primary Examiner* — Rip A Lee
(74) *Attorney, Agent, or Firm* — Norton Rose Fulbright Canada LLP (57) ABSTRACT

The present relates to a process for incorporating of wet natural fiber and starch into thermoplastics and the composite produced. The process for producing the composite comprises steps of: providing a wet natural fiber; providing a starch; providing a plasticizer; providing a thermoplastic; mixing the wet natural fiber, the starch and the plasticizer with water to produce a paste, and compounding the paste with the thermoplastic to produce the composite. The composite in a preferred embodiment comprises 50 weight % natural fiber/starch and a plasticizer; 50 weight % thermo-
(Continued)

plastic; a tensile modulus greater than 1450 MPa and a tensile strength greater than 41 MPa.

18 Claims, 5 Drawing Sheets

(51) Int. Cl.

| | | |
|---|---|---|
| *C08L 3/02* | (2006.01) | |
| *C08L 1/02* | (2006.01) | |
| *C08L 51/06* | (2006.01) | |
| *C08L 97/02* | (2006.01) | |
| *C08J 3/20* | (2006.01) | |
| *B29C 70/06* | (2006.01) | |
| *B29C 70/28* | (2006.01) | |
| *C08J 5/04* | (2006.01) | |
| *C08L 23/12* | (2006.01) | |
| *C08K 5/00* | (2006.01) | |
| *C08L 67/02* | (2006.01) | |
| *B29K 23/00* | (2006.01) | |
| *B29K 105/06* | (2006.01) | |
| *B29K 105/16* | (2006.01) | |
| *B29K 201/00* | (2006.01) | |

(52) U.S. Cl.
CPC ............ *C08J 5/045* (2013.01); *C08K 5/0016* (2013.01); *C08L 1/02* (2013.01); *C08L 3/02* (2013.01); *C08L 23/06* (2013.01); *C08L 23/12* (2013.01); *C08L 51/06* (2013.01); *C08L 67/02* (2013.01); *C08L 97/02* (2013.01); *B29K 2023/12* (2013.01); *B29K 2105/06* (2013.01); *B29K 2105/16* (2013.01); *B29K 2201/00* (2013.01); *B29K 2403/00* (2013.01); *C08J 2303/02* (2013.01); *C08J 2323/12* (2013.01); *C08J 2351/06* (2013.01); *C08J 2497/02* (2013.01)

(56) References Cited

U.S. PATENT DOCUMENTS

| | | | | |
|---|---|---|---|---|
| 2006/0194902 | A1* | 8/2006 | Nie | C08L 3/02 524/47 |
| 2007/0021534 | A1* | 1/2007 | Glenn | C08L 3/02 524/47 |
| 2009/0048368 | A1* | 2/2009 | Bash | C08L 3/02 523/122 |
| 2013/0096236 | A1* | 4/2013 | Bernaerts | C08L 3/02 524/9 |

FOREIGN PATENT DOCUMENTS

| | | | | |
|---|---|---|---|---|
| CN | 102161796 A | * | 8/2011 | ............ C08L 23/06 |
| CN | 102229750 A | * | 11/2011 | ............ C08K 13/06 |
| WO | 2011117549 A1 | | 9/2011 | |
| WO | 2012110237 | | 8/2012 | |

OTHER PUBLICATIONS

La Mantia, F.P.; Morreale, M.; Mohd Ishak, Z.A. J. Appl. Polym. Sci. 2005, 96, 1906-1913. (Year: 2005).*
Roy, S.B. et al., Polypropylene and potato starch biocomposites: Physicomechanical and thermal properties. Journal of Applied Polymer Science, 2011. 120(5): p. 3078-3086.
Kaseem, M., Hamad, K., and Deri, F., Thermoplastic starch blends: A review of recent works. Polymer Science Series A, 2012. 54(2): p. 165-176.
Woodhams, R.T., Thomas, G., and Rodgers, D.K., Wood fibers as reinforcing fillers for polyolefins. Polymer Engineering & Science, 1984. 24(15): p. 1166-1171.
La Manila, F.P., Morreale, M., and Ishak, Z.A.M., Processing and mechanical properties of organic filler-polypropylene composites. Journal of Applied Polymer Science, 2005. 96(5): p. 1906-1913.
Bledzki, A.K. et al., Thermoplastics Reinforced with Wood Fillers: A Literature Review. Polymer-Plastics Technology and Engineering, 1998. 37(4): p. 451-468.
Karmarkar, A. et al., Mechanical properties of wood-fiber reinforced polypropylene composites: Effect of a novel compatibilizer with isocyanate functional group. Composites Part A: Applied Science and Manufacturing, 2007. 38(2): p. 227-233.
Nygard, P. et al., Extrusion-based wood fibre-PP composites: Wood powder and pelletized wood fibres—a comparative study, Composites Science and Technology, 2008. 68(15-16): p. 3418-3424.
Azhari, C.H. et al., Morphology-mechanical Property Relationship of Polypropylene/starch Blends, Pakistan Journal of Biological Sciences 4 (6): 693-695, 2001.
Hamdan, S. et al., Compatibility Studies of Polypropylene (PP)Sago Starch (SS) Blends using DMTA, Journal of Polymer Research vol. 7, No. 4, 237-244, Dec. 2000.
Rosa, D.S. et al., Processing and thermal, mechanical and morphological characterization of post-consumer polyolefins/thermoplastic starch blends, J Mater Sci (2007) 42:551-557.
Luz, S.M. et al., Mechanical behavior and microstructural analysis of sugarcane bagasse fibers reinforced polypropylene composites, Composites: Part A 38 (2007) 1455-1461.
Bengtsson, Magnus et al., Extrusion and mechanical properties of highly filled cellulose fibre-polypropylene composites, Composites: Part A 38 (2007) 1922-1931.
PCT International Search Report from corresponding PCT/CA2015/050200 dated Jun. 10, 2015.
English language translation of CN 102161796.
Supplementary European Search Report dated Dec. 4, 2017 in corresponding EP Application 15776699.

* cited by examiner

PROCESS TO INCORPORATE WET NATURAL FIBER AND STARCH INTO THERMOPLASTICS

CROSS-REFERENCE TO RELATED APPLICATIONS

This application is a National Phase entry of PCT/CA2015/050200 filed Mar. 18, 2015, in which the United States of America was designated and elected, and which remains pending in the International phase until Oct. 10, 2016, which application in turn claims priority under 35 USC 119(e) from U.S. Provisional Application Ser. No. 61/977,972 filed Apr. 10, 2014.

BACKGROUND OF THE INVENTION

Field of the Invention

The present relates to a process for incorporating of natural fiber and starch into thermoplastics and the natural fiber/starch thermoplastic composite produced.

Description of the Prior Art

Thermoplastic starch is potentially a low cost alternative biodegradable plastic that is a readily available material, but owing to its poor mechanical properties and high susceptibility to water, its actual replacement of the polymers currently in use is limited. As one of the most abundant natural resources, natural fibers have been studied to enhance traditional petroleum based polymers in the past decades. However, due to the hydrophilic behavior of wood fiber, it is challenging to compatibilize polymer matrices with wood fibers and to uniformly disperse wood fibers into polymer matrices with minimal damage. The compatibility between natural fiber and thermoplastics is so poor that natural fiber tends to form agglomerates in thermoplastics which act as stress weak points resulting in decreased mechanical properties. For conventional manufacture of natural fiber/polymer composites, natural fiber should be dried very well prior to compounding, but the feeding of fluffy and entangled fibers into typical polymer process equipment is a great challenge.

Synthetic thermoplastics, such as polyethylene (PE), polypropylene (PP), polystyrene (PS) and poly (vinyl chloride) (PVC), have been widely used in modern society. To avoid the problems associated with the application of synthetic thermoplastics, for example, long-term environmental pollution and high raw material cost, composites utilizing biomaterials have been intensively studied and utilized in numerous applications. Natural fibers including wood fibers are normally used as fillers to reduce cost; however, the incorporation of natural fibers into thermoplastics usually impairs mechanical properties mainly due to the incompatibility between the hydrophobic polymer matrix and the hydrophilic natural fibers as well as fiber damage.

One of the widely used thermoplastics is polypropylene (PP). It is a widely used in the world due to its good electrical insulating properties, chemical inertness, moisture resistance and decent mechanical properties. However, the industries consuming PP always suffer from its high cost, especially at a time of rising petroleum prices. Starch granules and thermoplastic starch (TPS) have been blended with PP in efforts to obtain new materials with low cost and high biodegradability. Starch granules have been directly used as organic filler in PP matrix, with the results showing that with increasing starch granule content the tensile strength of the composites decreased owing to the poor compatibility between the hydrophilic starch and the hydrophobic PP [Roy, S. B., et al., *Polypropylene and potato starch biocomposites: Physicomechanical and thermal properties*. Journal of Applied Polymer Science, 2011. 120 (5): p. 3078-3086]. To improve its compatibility with polyolefins and processability, starch granules were plasticized prior to blending with polyolefins. However, the stress at break of the TPS/PP blends still decreased with increasing TPS content [Kaseem, M., K. Hamad, and F. Deri, *Thermoplastic starch blends: A review of recent works*. Polymer Science Series A, 2012. 54(2): p. 165-176.]. A scanning electron microscopy (SEM) study confirmed the mechanical results: poor adhesion and interfacial interaction between PP and TPS in the prepared blends was observed.

Natural fibers, such as wood, flax, ramie, jute and commercial regenerated cellulose fibers, have also been blended with polypropylene as a reinforcement and substitute material. These fibers are renewable and abundant in nature; therefore, the cost of the natural fibers is much cheaper than polypropylene. Besides, the natural fibers are non-abrasive so that relatively large concentrations could be incorporated into polyolefins without causing serious machine wear during fabrication [Woodhams, R. T., G. Thomas, and D. K. Rodgers, *Wood fibers as reinforcing fillers for polyolefins*. Polymer Engineering & Science, 1984. 24(15): p. 1166-1171]. There is also increasing demand for light-weight, cost-effective, green and sustainable composite products and blends. Compared to traditional reinforcing glass fiber, natural fiber has lower density, higher specific strength, and improved health and safety in handling. Wood fiber requires up to 60% less energy to produce and is carbon neutral. The global plastics market was estimated around 300 million tonnes in 2010, of which the market for glass fiber as reinforcement in structural composites—primarily automotive, packaging, construction—is estimated at 4-5 million, with potential annual growth of over 6%.

Usually, the incorporation of more than 50 wt. % natural fiber is desired for industrial scale fabrication in order to minimize product cost. However, it should be noted that with increasing natural fiber fraction, some properties of the composites decrease dramatically. For instance, the tensile and impact strength of thermo-mechanical pulp reinforced PP composites decreased from around 30 MPa and 51 J/m to around 14 MPa and 31 J/m when the fiber content increased from 0 to 60 wt. %, respectively [Mantia, F. P. L., M. Morreale, and Z. A. M. Ishak, *Processing and mechanical properties of organic filler—polypropylene composites*. Journal of Applied Polymer Science, 2005. 96(5): p. 1906-1913]. The property reduction is because of poor dispersion in the matrix and weak interfacial adhesion between fiber and matrix as well as fiber damage [Bledzki, A. K., S. Reihmane, and J. Gassan, *Thermoplastics Reinforced with Wood Fillers: A Literature Review*. Polymer-Plastics Technology and Engineering, 1998. 37(4): p. 451-468]. The tendency of fibers to self-agglomerate, especially for the fibers containing more than 10 wt. % moisture, makes it difficult to disperse uniformly in a hydrophobic matrix. Currently, natural fibers, prior to blending with polyolefins, must be dried to less than 1 wt. % moisture in order to reduce fiber self-agglomeration [Karmarkar, A., et al., *Mechanical properties of wood-fiber reinforced polypropylene composites: Effect of a novel compatibilizer with isocyanate functional group*. Composites Part A: Applied Science and Manufacturing, 2007. 38(2): p. 227-233.], which requires drying equipment and consumes a lot of energy. Pelletizing fiber is another approach to facilitate fiber feeding and dispersion. The pelletization process includes increasing fiber moisture content to 60~70%, pelletizing with a mesh and a rotating knife, and drying to less than 1% moisture, which obviously increases the cost and cannot avoid fiber damage. For example, the length and aspect ratio of chemi-thermomechanical pulp fibers was reduced from 1.50 mm and 42 to 0.84 mm and 23.9, respectively, after pelletization [Nygard, P., et al., Extrusion-based wood fibre-PP composites: Wood powder and pelletized wood fibres—a comparative study. Composites Science and Technology, 2008. 68(15-16): p. 3418-3424]. Severe fiber damage was normally observed during extrusion. For example, La Mantia et al. [ibid] reported that after twin-screw extrusion, the length of the wood fibers in a polypropylene composite containing 60 wt. % fibers decreased by more than 80%. It is still a big challenge to uniformly disperse natural fibers in polymer matrices with minimized fiber damage.

SUMMARY OF THE INVENTION

It is an object of this invention to provide a process to disperse wet natural fibers uniformly in polymeric matrices with minimum fiber damage and improved tensile properties comparing to pure polymers. Using wet fibers is also expected to reduce production costs in terms of the energy needed to dry the fibers.

In one aspect of the present invention there is provided a process for producing a natural fiber/starch thermoplastic composite comprising steps of: providing a wet natural fiber comprising a total amount of natural fiber; providing a starch comprising a total amount of starch; providing a plasticizer comprising a total amount of plasticizer; providing a thermoplastic comprising a total amount of thermoplastic; mixing the wet natural fiber, the starch and the plasticizer with water to produce a paste, wherein the water comprising a total amount of water, and compounding the paste with the thermoplastic to produce the composite.

In another aspect of the process described herein, the mixing of the wet natural fiber, the starch and the plasticizer with the water to produce the paste is based on a weight ratio, $WR_{paste}$=(the total amount of natural fiber on a dry weight basis+the total amount of starch on a dry weight basis+a total amount of plasticizer)/the total amount of water=about 0.5 to 1.

In another aspect of the process described herein, further comprising steps of drying the paste to a film, cutting the film into strips before compounding with the thermoplastic.

In another aspect of the process described herein, the thermoplastic is selected from polypropylene (PP), polyethylene (PE), polyester and combinations thereof, and wherein the thermoplastic further comprises at least one of a polypropylene (PP), a polyethylene (PE), a polyester each grafted with at least one of a fumaric acid, a maleic acid, a maleic anhydride and combinations thereof.

In another aspect of the process herein described, the thermoplastic is polypropylene and a polypropylene grafted maleic anhydride.

In another aspect of the process herein described, the plasticizer is glycerol.

In another aspect for the invention there is provided a process for producing a natural fiber/starch thermoplastic composite comprising steps of: providing a wet natural fiber comprising a total amount of natural fiber; providing a starch comprising a total amount of starch; providing a plasticizer comprising a total amount of plasticizer; providing a thermoplastic comprising a total amount of thermoplastic; mixing the wet natural fiber, the starch and the plasticizer with water to produce a paste, wherein the water comprising a total amount of water, drying the paste to a film, cutting the film into strips before compounding with the thermoplastic and compounding the paste with the thermoplastic to produce the composite.

In another aspect of the process described at least at paragraph 0 herein, the mixing of the wet natural fiber, the starch and the plasticizer with the water to produce the paste is based on a weight ratio, $WR_{paste}$=(the total amount of natural fiber on a dry weight basis+the total amount of starch on a dry weight basis+a total amount of plasticizer)/the total amount of water=about 0.5 to 1.

In another aspect of the process described herein, the thermoplastic is selected from polypropylene (PP), polyethylene (PE), polyester and combinations thereof, and wherein the thermoplastic further comprises at least one of a polypropylene (PP), a polyethylene (PE), a polyester grafted with a fumaric acid, a maleic acid, a maleic anhydride and combinations thereof.

In another aspect of the process described herein, the thermoplastic is polypropylene and a polypropylene grafted maleic anhydride.

In another aspect of the process described herein, the plasticizer is glycerol.

In a further aspect of the invention there is provided a natural fiber/starch thermoplastic composite comprising 50 weight % natural fiber/starch and a plasticizer; and 50 weight % thermoplastic; wherein a tensile modulus greater than 1450 MPa, and a tensile strength greater than 41 MPa.

In another aspect of the composite described herein, the thermoplastic is polypropylene and a polypropylene grafted maleic anhydride.

In another aspect of the composite described herein, the plasticizer is selected from the group consisting of ethylene glycol, propylene glycol, glycerol and combination thereof.

In another aspect of the composite described herein, the plasticizer is glycerol.

In another aspect of the composite described herein, the glycerol is 31 weight % in the composite.

In accordance with the invention, the water inside the fiber is used to plasticize starch while the fiber enhances the properties of the thermoplastic starch. The resulting thermoplastic starch is then used as a fiber carrier to help feed and disperse fibers uniformly in the composites and avoid fiber damage during the composite-making process. The moisture in wet fibers and a small amount of plasticizer, such as glycerol, are used to plasticize starch. The natural fibers can thus be uniformly dispersed in the plasticized starch likely due to the chemical similarity of polysaccharides and plant fibers, increasing the compatibility of one for the other. The prepared composites show higher tensile properties as compared to the regular polymer at a fiber/starch content of more than 50 wt. %. The composites prepared with wet fiber also have higher strength properties than the ones made with dry fiber.

This novel process can also be used for other cellulose-based products such as cellulose nanocrystals, cellulose filaments, microcrystalline cellulose etc. The water inside these cellulose products can be used to plasticize starch while the cellulose-based products, on the other hand, enhance starch properties. Furthermore, the starch acts as a carrier to disperse these cellulose-based products into polymer composites uniformly.

DETAILED DESCRIPTION OF THE INVENTION

The present invention relates to a process for incorporating wet natural fibers or other cellulose-based products into thermoplastics uniformly and results in enhanced thermoplastics.

Wet fiber can be introduced into thermoplastics by either a one-step process or through a two-step master batch process also called the "hot pot" method, as described below. In the one-step process, composite materials are made in a continuous manner using the same polymer processing equipment: wet pulp fibers are first mixed with starch granules and glycerol, the starch is then plasticized under certain conditions, and, finally, the plasticized starch is mixed with polymer and compatibilizer to make composites.

In the two-step method (hot pot method), natural fibers were dispersed in a starch suspension in a hot pot in the presence of a large amount of water. The natural fibers were dispersed in the starch suspension at high temperature to plasticize the starch. The plasticized starch slurry with uniformly dispersed natural fibers inside was dried in a convection oven prior to being blended with thermoplastics in polymer processing equipment. The comparison between the composites fabricated with wet fiber and those with dry fiber demonstrates that uniform fiber dispersion and minimized fiber damage can be realized by the wet fiber process of this invention.

Natural fibers tend to form a gel in aqueous solutions at very low solids content (8~10%). The water inside the gel, which is very difficult to remove through evaporation. The presently described process uses water within the natural fiber and/or used to disperse the natural fiber as a plasticizer of starch. A wet fiber and starch mixture/paste, with one or more further plasticizer(s), can be thermo-mechanically blended with any residual water to further enhance fiber dispersion and starch plasticization. Any remaining water in the plasticized starch can be readily evaporated during polymer processing. This thermoplastic starch (TPS) containing natural fibers can then be blended with thermoplastic polymers to obtain biopolymer composites with enhances physical properties.

The process described herein has the advantage of incorporating wet natural fiber into thermoplastic composites uniformly, with minimum fiber damage, and without the need to dry fiber before compounding, thus overcoming disadvantages of the prior art. The resulting TPS/fiber/thermoplastic composites have higher strength than the corresponding neat polymer composites or the composites prepared using dried fibers.

Wet fiber can be introduced into thermoplastics by either a one-step method or through a two-step master batch approach.

This process described herein can also be used for other cellulose-based products such as cellulose nanocrystals, cellulose filaments, microcrystalline cellulose etc. the water inside these cellulose products can be used to plasticize starch while the cellulose-based products, on the other hand, enhance starch properties. Furthermore, the starch acts as a carrier to disperse these cellulose-based products into polymer composites uniformly.

Figure 1:
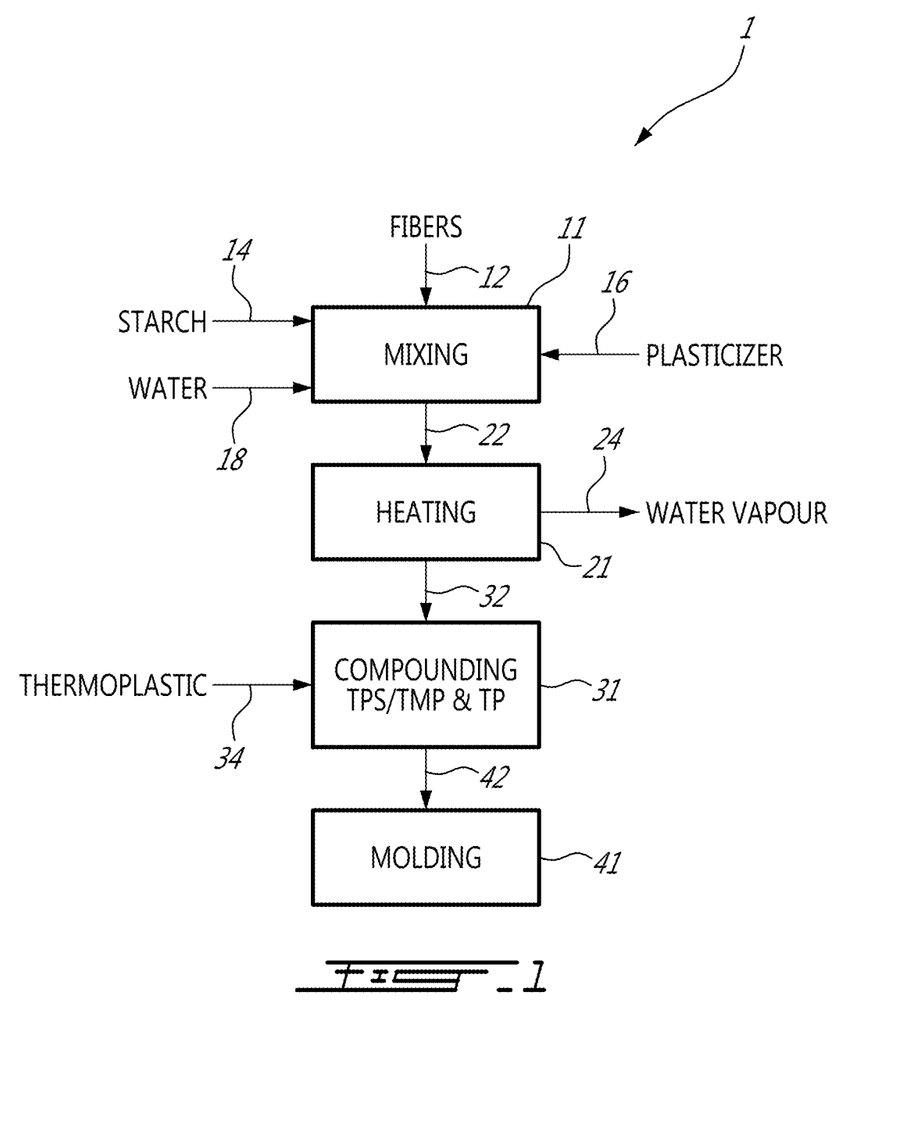
FIG. 1 is a block diagram illustrating a process of incorporating natural fiber/starch into a thermoplastic according to one embodiment of the present invention.

FIG. 1 illustrates an embodiment of a "one-step" process 1 for incorporating natural fibers that are wet (non-dried) into a thermoplastic. according to the present invention. The process begins with the mixing/blending 11 of a natural fiber 12, a starch 14, and a plasticizer 16 and water 18. A total amount or quantity (weight) of each of the natural fiber 12, the starch 14, and the plasticizer 16 and the water 18 is provided.

The weight ratio, $WR_{paste}$, that is the summation of the total amounts fiber starch and plasticizer on a dry weight basis divided by the total amount of water added to the paste.

$WR_{paste}$=(fiber+starch+plasticizer)/water equals approximately 0.5 to 1, where the fiber and starch are on a dry weight basis. If the plasticizer is a powder the total amount of plasticizer used in the calculation of the $WR_{paste}$ will be on a dry basis also.

In a preferred embodiment the weight ratio, $WR_{paste}$, is about 0.1 to 5; preferably 0.2 to 2, and most preferably 0.5 to 1.

The fiber/starch/plasticizer/water/ are blended into a TPS/TMP paste 22 that is heated 21 with water vapour 24 generally released. A total amount or quantity (weight) of thermoplastic is provided. The weight ratio of TPS/TMP paste 22/thermoplastic (TP) 34, or the $WR_{composite}$ can vary, the ratio may be 25/75 (0.25); 35/65 (0.5375) and most preferably 50/50 (1). The $WR_{composite}$ is calculated by dividing the weight on a dry basis of the TPS/TMP paste 22 by the dry basis weight of the thermoplastic 34.

The mixing/blending TPS/TMP paste 32 with the thermoplastic 34 is called compounding 31. Higher temperatures are generally used, that will reduce the viscosity of the components and help to ensure a uniform compounding with a thermoplastic (TP) 34 and TPS/TMP paste 32. The TPS/TMP/thermoplastic composite 42 is now ready to be molded 41 into composite objects.

A "natural fiber" is defined herein as any natural fiber particularly from wood, flax, hemp, jute, cotton, sisal, kenaf, rattan, vine, bamboo, grass, and any combination thereof. In a preferred embodiment the natural fiber is a softwood thermo-mechanical pulp (TMP), that is used in its native or non-dried form.

A "starch" is defined herein as a complex carbohydrate made up of plurality of glucose units each attached to one another through a glycosidic bond, —O—. In a preferred embodiment the starch is in pellet form, (not as a fine powder) and is wheat based.

A "plasticizer" is defined herein a compound that increases fluidity/plasticity of the material. In the present description, the plasticizer improves the fluidity of the paste. In a preferred embodiment the plasticizer is a di-, tri-hydroxide, ether or carboxylic ester. In a preferred embodiment the plasticizer is selected from the group consisting of diethyl phthalate, disobutyl phthalate, dibutyl maleate, diisobutyl maleate, ethylene glycol, propylene glycol, glycerol and combination thereof. In a preferred embodiment the plasticizer is selected from the group consisting of ethylene glycol, propylene glycol, glycerol and combination thereof. In a particularly preferred embodiment the plasticizer is glycerol.

A "thermoplastic" is defined herein as a polymers that is selected from the group consisting of polypropylene, polyurethane, polyvinyl acetate, polyvinyl chloride, polystyrene, polyethylene, polyester, polycarbonate, polyethylene terephthalate, acrylic, acrylonitrite butadiene styrene, and combinations thereof. In a particularly preferred embodiment the thermoplastic is polypropylene (PP), polyethylene (PE), polyester, polycarbonate, polyethylene terephthalate, and combinations thereof. In a preferred embodiment the thermoplastics may be functionalized with a plasticizer moiety grafted to the thermoplastic, in a preferred embodiment the polypropylene (PP), polyethylene (PE), polyester, are grafted with a fumaric acid, a maleic acid, a maleic anhydride and combinations thereof. In a particularly preferred embodiment the thermoplastic is polypropylene and a polypropylene grafted maleic anhydride.

A "composite" is understood to be a mixture of natural fiber/starch and plasticizer; and thermoplastic ready for molding or after molding.

A "dry weight basis" is understood as the weight (mass) of a raw material as it would be when completely dry.

Figure 2:
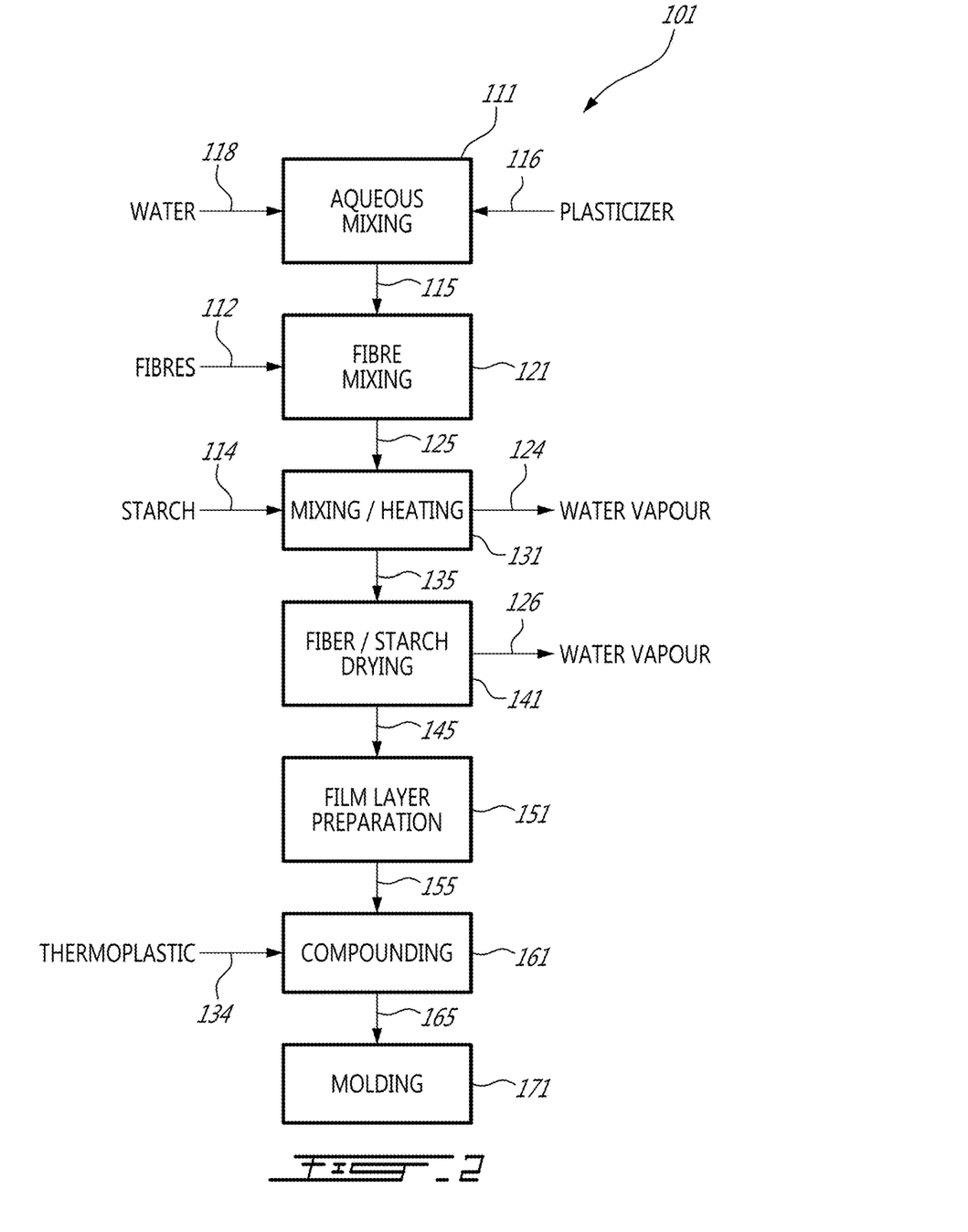
FIG. 2 is a block diagram illustrating a process of incorporating natural fiber/starch into a thermoplastic according to another embodiment of the present invention.

FIG. 2 illustrates an embodiment of a "two-step" process 101 or "hot pot method" for incorporating natural fibers into a thermoplastic 134. Firstly, water 118 and plasticizer 116 are mixed 111 to produce an aqueous solution/suspension 115. Natural fibers 112 are added to the solution/suspension 115, and well mixed 121 to produce a fiber mixture 125. The fiber mixture 125 is mixed with starch 114 while being heated 131, water vapour 124 is generally released, and a fiber/starch mixture 135 is produced. The mixture 135 is dried 141 before further processing with more water vapour 126 released. The fiber/starch drying process 141 is conducted generally in a convection oven on a mesh and produces a fiber/starch film layer 145.

The drying 151 to produce the fiber/starch is generally at least 12 hour; preferably between 12 and 24 hours, and more preferably 24 hours long. The temperature of drying in the 151 process is less than 60° C.; preferably less than 50° C.; and more preferably than 45° C. and most preferably 40° C.

The fiber/starch film 145 is then prepared 151 by cutting or shredding the film 145 into macroscopic pieces 155. A pelletizing process can also be used to prepare macroscopic pieces 155 into pellets. The pieces/pellets 155 are transferred to a heated vessel at approximately 160° C., where the pieces 155 are compounded 161 with a thermoplastic 134. The compounded TPS/TMP/TP 165, can then be removed and molded 171. Molding 171 is generally by compression molding.

EXAMPLES

The following raw materials/chemicals where used: softwood (spruce) thermo-mechanical pulp (TMP); wheat starch in granule form; glycerol; polypropylene (PP) and maleic anhydride grafted polypropylene (MAPP).

The softwood TMP fibers used as a reinforcing agent for the starch/PP composites, had on average, a fiber length of 2.02 mm and a moisture content of 66%. The wheat starch granules contained 25% amylose and 10% of moisture.

The plasticizer for starch used was reagent grade glycerol.

A polypropylene homopolymer PP1024E4 with a melt flow index of 13 g/10 min was purchased from ExxonMobil. This grade of PP is designed for automotive, cast film, compounding, packaging, and medical/health care industries applications.

The MAPP used had an acid number and molecular weight of 15 mg KOH/g and 47,000 g/mol, respectively.

The concept of the one-step process was confirmed by using an internal batch mixer—Thermo Scientific Haake Polylab QC Internal mixer, that simulates continuous processing in a twin-screw extruder, as would be used on an industrial scale. The internal mixer had a chamber of about 30 cm$^3$ and three heating elements. In the one-step process of the Examples, all the raw materials are used in substantially their native form, substantially free of pretreatment. "Free of pretreatment" is understood be mean that substantially no drying, no grinding, no filtering, was undertaken before processing according to the present invention.

Starch granules, glycerol and pulp fibers were manually mixed in the presence of water to make a dough-like mixture. The water amount used was equivalent to the total weight of dry starch, dry pulp fiber and glycerol. The internal mixer was pre-heated to 165° C. and set at 100 rpm. The dough-like mixture was introduced to the internal mixer and blended for about 6 minutes, during which water vapor needed to be vented. The chamber temperature was then controlled at 160° C.; and PP and MAPP were added and mixed for 10 minutes at 60 rpm. At the end of processing, the composite material was discharged and compression molded into dog-bone shaped samples.

The hot pot mixing method (illustrated in FIG. 2) uses a simple set of equipment: a barrel-shaped container with a capacity of 2 liters, heating elements attached on the bottom of the container, a temperature control device, a thermocouple and a laboratory mixer of 1 HP in power with a multi-teeth mixing blade of 8 cm in diameter. All the raw materials were used as received. First, 800 mL city tap water and certain amount of glycerol were mixed in the container; meanwhile the mixture was heated to about 40° C.

Wet pulp fibers were introduced to the container and mixed with water and glycerol for about 5 minutes until the pulp fibers were well swollen and dispersed in the water/glycerol mixture. Starch granules were gradually added and mixed at 40° C. for 5 minutes. The entire mixture was then heated to a temperature of 90° C. at a heating rate about 2.5° C./min. During the heating, the rotating speed was controlled according to the viscosity variation of the mixture. Once the temperature was reached, an extra 3-minute mixing was applied; and then, the paste mixture was discharged into a silicone container. The paste mixture was dried in a 40° C. convection oven over a period of 24 hours. Thus prepared TMP/TPS biocomposites were cut into pellets with a size of about 5×5×5 $mm^3$. Table 1 shows the compositions of some precursory mixtures (TPS) and TMP/TPS biocomposites prepared by both methods.

TABLE 1

Compositions of the precursory mixtures (TPS) and TMP/TPS biocomposites prepared by one-step method (IM) and hot pot method (HP).

| Sample | Starch (g)* | Pulp fiber (g)* | Glycerol (g) | Method |
|---|---|---|---|---|
| 1 | 100 | 0 | 30 | HP |
| 2 | 100 | 0 | 45 | HP |
| 3 | 100 | 0 | 60 | HP |
| 4 | 100 | 33 | 30 | HP |
| 5 | 100 | 37 | 45 | HP |
| 6 | 100 | 42 | 60 | HP |
| 7 | 100 | 16 | 45 | HP |
| 8 | 100 | 48 | 45 | HP |
| 9 | 8 | 10 | 3 | IM |
| 10 | 11.2 | 4.1 | 4 | IM |
| 11 | 11.2 | 4.1 | 5 | IM |
| 12 | 9 | 6 | 6 | IM |

*Dry weight;
**Glycerol weight fraction and pulp fiber fraction were calculated based on the weight of dry starch and glycerol and the total weight of dry starch, dry fiber and glycerol, respectively.

The internal mixer was used to compound TMP/TPS biocomposites with PP. In order to compound TMP/TPS biocomposites with PP, the internal mixer was preheated to 165° C. and the rotation speed was set at 50 rpm. The TMP/TPS biocomposites containing pulp fibers was first added to the internal mixer and blended; once the temperature reached 160° C., PP and MAPP were added simultaneously, and mixed for an additional 12 minutes at the speed of 60 rpm. The composite samples extracted from the internal mixer were compression molded into dog-bone samples.

Figure 3A:
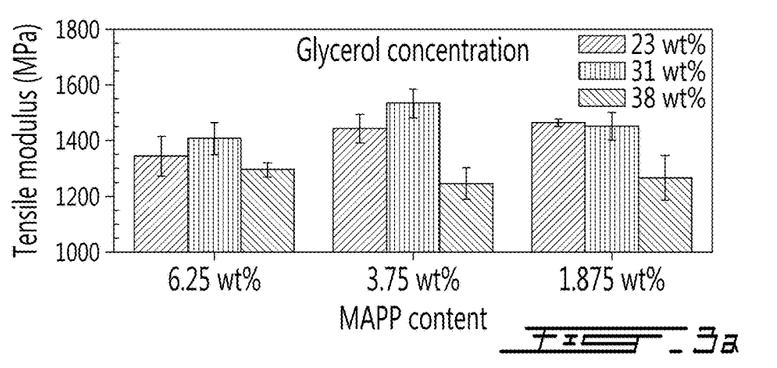
FIG. 3(a) is a bar chart that illustrates the variation in the Tensile Modulus (MPa) of TMP/TPS (Thermo Mechanical Pulp/Thermo Plastic Starch) reinforced PP composites at a TMP/TPS fraction of 50% as a function of glycerol and MAPP content according to one embodiment of the present invention.
Figure 3B:
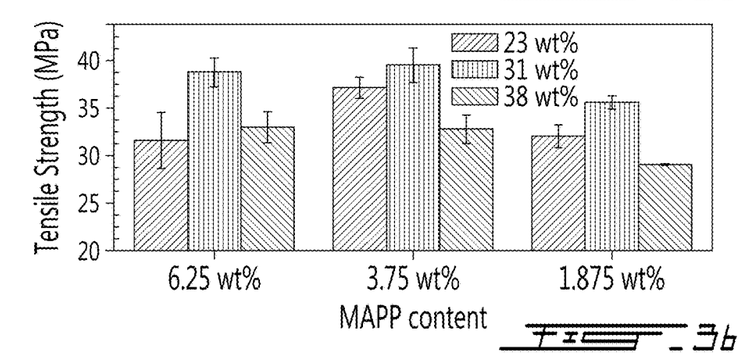
FIG. 3(b) is a bar chart that illustrates the variation in the Tensile Strength (MPA) of a TMP/TPS reinforced PP composites at a TMP/TPS fraction of 50% as a function of glycerol and MAPP content according to the embodiment of FIG. 1(a)

Samples were prepared having a glycerol weight % of 23%, 31% and 38%. These same samples were prepared with a weight % of MAPP of 6.25%, 3.75% and 1.875% the tensiles properties of tensile modulus (MPa) and tensile strength (MPa) are shown in FIGS. 3(a) and 3(b) respectively. All the samples illustrated in FIGS. 3(a) and 3(b) had TMP/TPS biocomposites prepared by the hot pot method, compounded with PP at a ratio of 50/50.

The variation in the glycerol and MAPP content affected the tensile properties of the final composites. A glycerol content of 31 wt % gave the highest tensile properties as compared to 23 and 38 wt % at all MAPP levels. An MAPP content of 3.75 wt % led to higher tensile properties than the other two loadings. Therefore, 31 wt % glycerol, 20 wt % pulp fiber and 3.75 wt % MAPP were selected for the following examples below.

Figure 4:
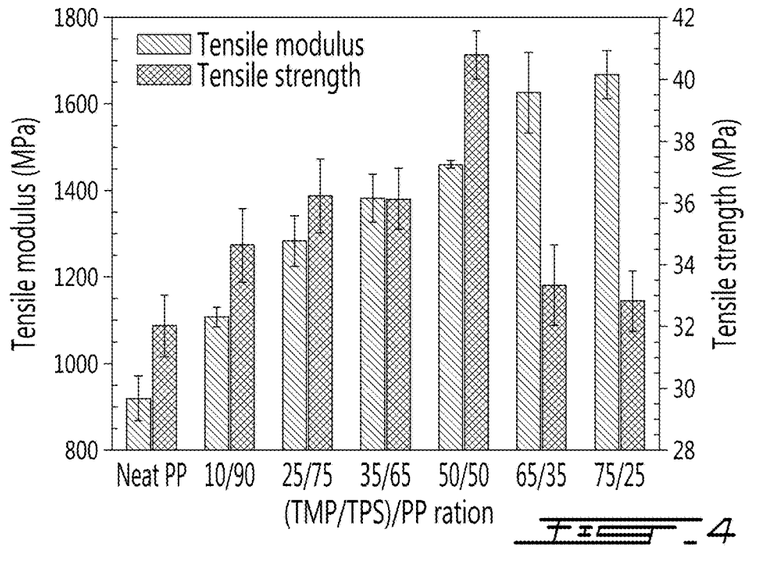
FIG. 4 is a bar chart that illustrates the variation in the Tensile Modulus (MPa) an the Tensile Strength (MPa) of TMP/TPS (with wet fiber) six samples of reinforced (TMP/TPS)/(PP) composites as compared to a PP fraction 100%, the (TPM/TPS)/(PP) from 10/90%; 25/75%; 35/65%; 50/50%; 65/35% to 75/25% (all % are weight percentages) produced by the one-step method according to an embodiment of present invention.

The tensile properties of TMP/TPS/PP composites at various TMP/TPS contents (0, 10, 25, 35, 50, 65 and 75 wt %) prepared by the one-step method are shown in FIG. 4.

The tensile modulus and strength of the neat PP were approximately 920 and 32 MPa, respectively. With increasing TMP/TPS content (0 to 75%), the tensile modulus dramatically increased by about 81%; the tensile strength reached a peak value, which was about 23% higher than that of the neat PP, at the TMP/TPS content of 50%. At 75% TMP/TPS, the composite still possessed a slightly higher tensile strength than the neat PP. The present results are superior to the results reported by La Mantia [ibid]. La Mantia reported that the tensile strength of PP composites reinforced with natural fiber decreased with increasing fiber content and, at a fiber content of 60 wt %, the tensile strength decreased around 50% as compared to the neat PP. Normally, the testing samples prepared by the injection molding method used by La Mantia [ibid] will show higher tensile strength than those prepared by compression molding because fibers orient in the flow direction during injection. Therefore the wet mixing method of the present invention improves composites strength likely due to better fiber dispersion and less fiber damage.

Figure 5A:
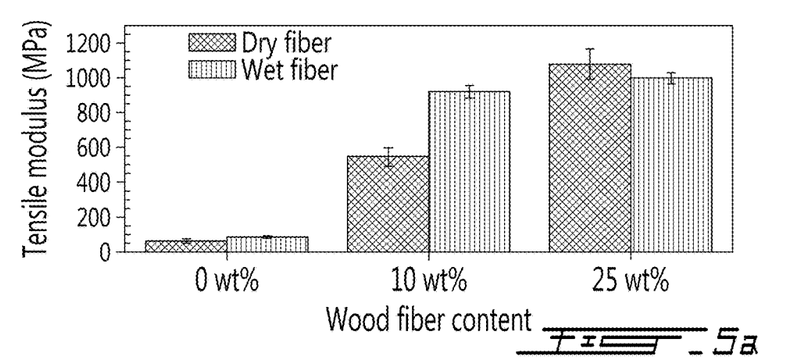
FIG. 5(a) is a bar chart that illustrates the Tensile Modulus, MPa, of (TPM/TPS)/PP at a fiber content (0, 10, and 25 wt. %) and influence the fabrication method (with dry or wet fiber) has on the fiber reinforced thermoplastic starch composite produced according to another embodiment of the present invention.
Figure 5B:
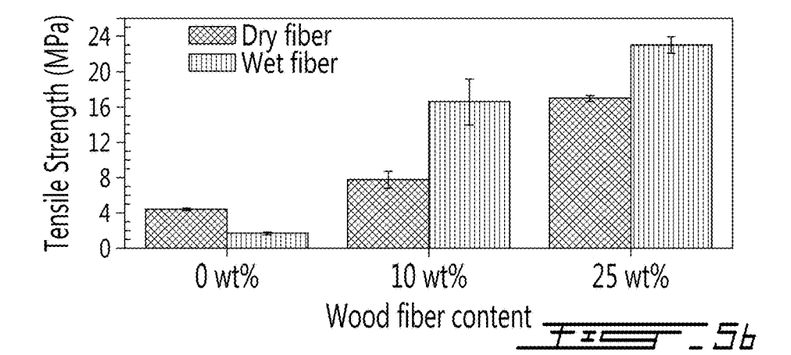
FIG. 5(b) is a bar chart that illustrates the Tensile Strength (MPa) of (TPM/TPS)/PP at a fiber content (0, 10, and 25 wt. %) and influence the fabrication method (with dry or wet fiber) has on the fiber reinforced thermoplastic starch composite produced according to another embodiment of the present invention.

FIGS. 5(a) and 5(b) compare the tensile properties of TMP/TPS biocomposites prepared by the one-step method using either wet or dry fibers. The fiber in the TMP/TPS varies from 0 to 25% w/w. As shown, the increase in the pulp fiber content leads to improved tensile modulus and strength which indicated the reinforcement effect of fibers on TPS. However, the TMP/TPS biocomposites prepared using wet fibers at 10 and 25 wt % have higher tensile strength than the samples prepared using dry fibers. Visually the testing sample with wet fibers shows a more uniform fiber dispersion than the one with dry fibers, which contributes to a higher tensile strength.

Figure 6:
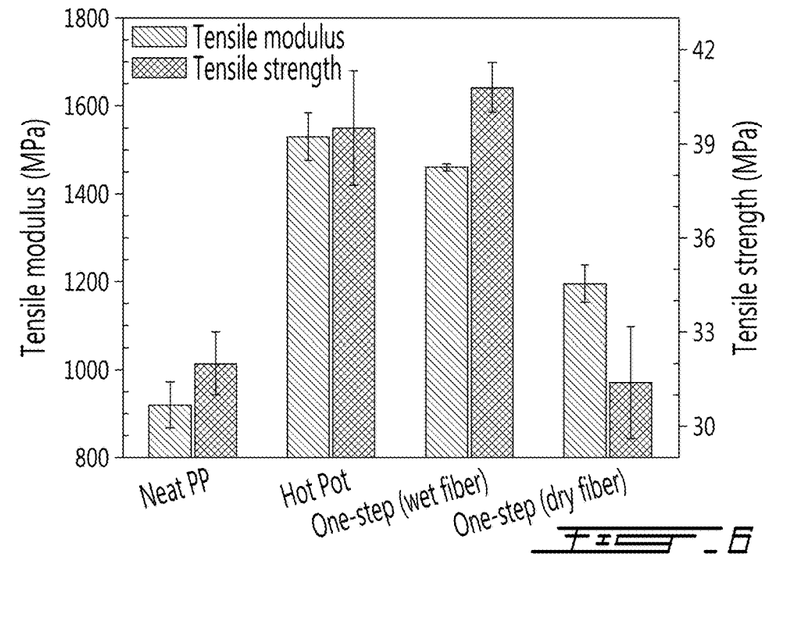
FIG. 6: Tensile properties of neat PP and TMP/TPS reinforced PP composites prepared by hot pot and one-step methods.

FIG. 6 illustrates the tensile properties of different samples made by the hot pot method and the one-step method (wet and dry fibers). TMP/TPS was used to replace 50% of PP in the final composite (the final composition of the composite is, based on the total weight of the composite, 10% wood fiber, 15% glycerol, 25% starch, and 50% PP). It is clearly shown that the composite with wet fiber from the one-step method has comparable tensile properties to the one with the hot pot method. The results demonstrate that the wet fibers in the one-step method must have very similar fiber dispersion as those in the hot pot method. The composite with dry fiber prepared by the one-step method exhibited reduced tensile modulus and strength as compared to the composites made with wet fiber. The results confirm that uniform fiber dispersion and minimized fiber damage was realized by using the wet fiber.

Figure 7A:
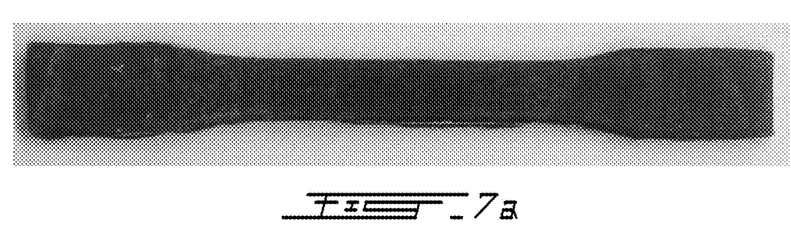
FIG. 7a illustrates a dog-bone composite testing sample prepared by the masterbatch method with wet fiber.
Figure 7B:
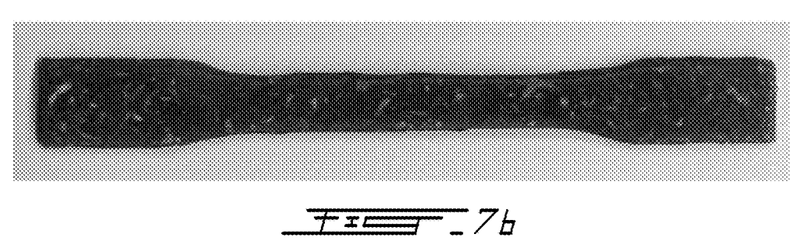
FIG. 7b illustrates a natural fiber/starch thermoplastic composite according to one embodiment of the present invention prepared with a dry fiber.

FIGS. 7(a) and 7(b) are the dog-bone composite testing samples prepared by the master-batch method with (a) wet fiber; (b) dry fiber. The TMP/TPS was used to replace 50% of PP in the final composite and the composition of the final composite, based on the total weight of the composite, is 10% wood fiber, 15% glycerol, 25% starch, and 50% PP). FIGS. 7(a) and 7(b) shows that the composite with wet fibers has a more uniform distribution of fibers in the composites while the sample with dry fiber still has numerous fiber bundles in the composite (seen as lighter zones throughout the sample).

Figure 8A:
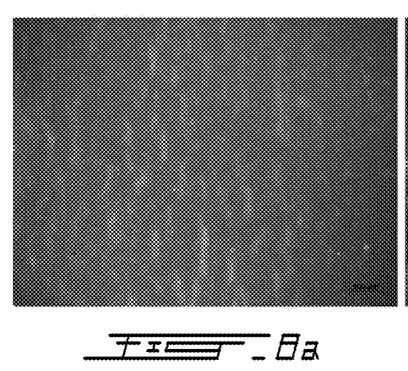
FIG. 8(a) is a microscopic image of the dog-bone composite of FIG. 7a according to one embodiment of the present invention prepared with a wet fiber.
Figure 8B:
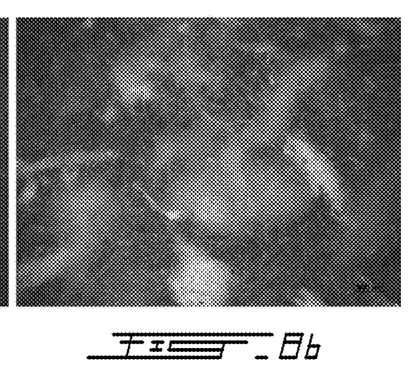
FIG. 8(b) is a microscopic image of the dog-bone composite of FIG. 7b according to one embodiment of the present invention prepared with a dry fiber.

FIGS. 8(a) and 8(b) are the microscopic images of the composite samples from FIGS. 7(a) and 7(b) using (a) wet fiber and (b) dry fiber. These photographs further clearly show that wet fiber approach produces a uniform composite where fibers are well dispersed in the composite matrix. By contrast, a large number of fiber bundles are present in the composite with the dry fiber method (once again visible as lighter areas throughout the sample). We believe water in wet fiber helps to plasticize starch and compensate the strength loss if only starch is used in composites. On the other hand, plasticized starch acts as a fiber carrier, minimizes the damage of fiber and facilitates the fiber distribution in the composite-making process.

Preliminary results also showed that the addition of 0.5 wt % Cellulose Nanocrystals (CNC) to a 20% thermoplastic starch (TPS)/80% LDPE polymer composite improved the tensile strength by 40% compared to the 20% TPS/80% LDPE composite without any CNC and by 30% compared to the 100% LDPE polymer. Furthermore, the addition of 0.5 wt % CNC to 20% TPS/80% LDPE did not result in any change in the elongation at break compared to the 20% TPS/80% LDPE composite without any CNC. However, the elongation at break of this polymer composite was higher by 25% compared to the 100% LDPE polymer.

The invention claimed is:

1. A process for producing a natural fiber/starch thermoplastic composite comprising steps of:
providing a wet natural fiber comprising a total amount of natural fiber;
providing a starch comprising a total amount of starch;
providing a plasticizer comprising a total amount of plasticizer;
providing a thermoplastic comprising a total amount of thermoplastic;
mixing the wet natural fiber, the starch and the plasticizer with water to produce a paste, wherein the water comprises a total amount of water, and
compounding the paste with the thermoplastic to produce the composite.

2. The process of claim 1, wherein the mixing of the wet natural fiber, the starch and the plasticizer with the water to produce the paste is based on a weight ratio, WRpaste=(the total amount of natural fiber on a dry weight basis+the total amount of starch on a dry weight basis+a total amount of plasticizer)/the total amount of water=0.1-5.

3. The process of claim 1, further comprising steps of pelletizing or drying the paste to a film, cutting the film into strips before compounding with the thermoplastic.

4. The process of claim 1, wherein the thermoplastic is selected from polypropylene (PP), polyethylene (PE), polyester or combinations thereof, and wherein the thermoplastic further comprises at least one of a polypropylene (PP), a polyethylene (PE), or a polyester each grafted with at least one of a fumaric acid, a maleic acid, a maleic anhydride or combinations thereof.

5. The process of claim 1, wherein the thermoplastic is polypropylene and a polypropylene grafted maleic anhydride.

6. The process of claim 1, wherein the plasticizer is selected from the group consisting of ethylene glycol, propylene glycol, glycerol and combinations thereof.

7. The process of claim 1, wherein the plasticizer is glycerol.

8. The process of claim 7, wherein glycerol is 31 weight % in the composite.

9. A process for producing a natural fiber/starch thermoplastic composite comprising steps of:
providing a wet natural fiber comprising a total amount of natural fiber;
providing a starch comprising a total amount of starch;
providing a plasticizer comprising a total amount of plasticizer;
providing a thermoplastic comprising a total amount of thermoplastic;
mixing the wet natural fiber, the starch and the plasticizer with water to produce a paste, wherein the water comprises a total amount of water,
drying the paste to a film,
cutting the film into strips before compounding with the thermoplastic and
compounding the paste with the thermoplastic to produce the composite.

10. The process of claim 9, wherein the mixing the wet natural fiber, the starch and the plasticizer with the water to produce the paste is based on a weight ratio, WRpaste=(the total amount of natural fiber on a dry weight basis+the total amount of starch on a dry weight basis+a total amount of plasticizer)/the total amount of water=0.1-5.

11. The process of claim 9, wherein the thermoplastic is selected from polypropylene (PP), polyethylene (PE), polyester or combinations thereof, and wherein the thermoplastic further comprises at least one of a polypropylene (PP), a polyethylene (PE), or a polyester grafted with a fumaric acid, a maleic acid, a maleic anhydride or combinations thereof.

12. The process of claim 9, wherein the thermoplastic is polypropylene and a polypropylene grafted maleic anhydride.

13. The process of claim 9, wherein the plasticizer is glycerol.

14. A natural fiber/starch thermoplastic composite comprising
50 weight % natural fiber, starch and a plasticizer; and
50 weight % thermoplastic;
wherein the natural fiber/starch thermoplastic composite has a tensile modulus greater than 1450 MPa, and
a tensile strength greater than 41 MPa, as measured with an Instron Universal testing machine according to ASTM D638 standard, at room temperature and humidity of 25° C. and 50% and with a crosshead speed of 5 cm/min.

15. The composite of claim 14, wherein the thermoplastic is polypropylene and a polypropylene grafted maleic anhydride.

16. The composite of claim 14, wherein the plasticizer is selected from the group consisting of ethylene glycol, propylene glycol, glycerol and combinations thereof.

17. The composite of claim 14, wherein the plasticizer is glycerol.

18. The composite of claim 17, wherein glycerol is 31 weight % in the composite.

* * * * *